F. A. G. PAPE.
NUT CRACKING MACHINE.
APPLICATION FILED SEPT. 20, 1919.
1,342,690.
Patented June 8, 1920.
3 SHEETS—SHEET 1.
Fig. 1,
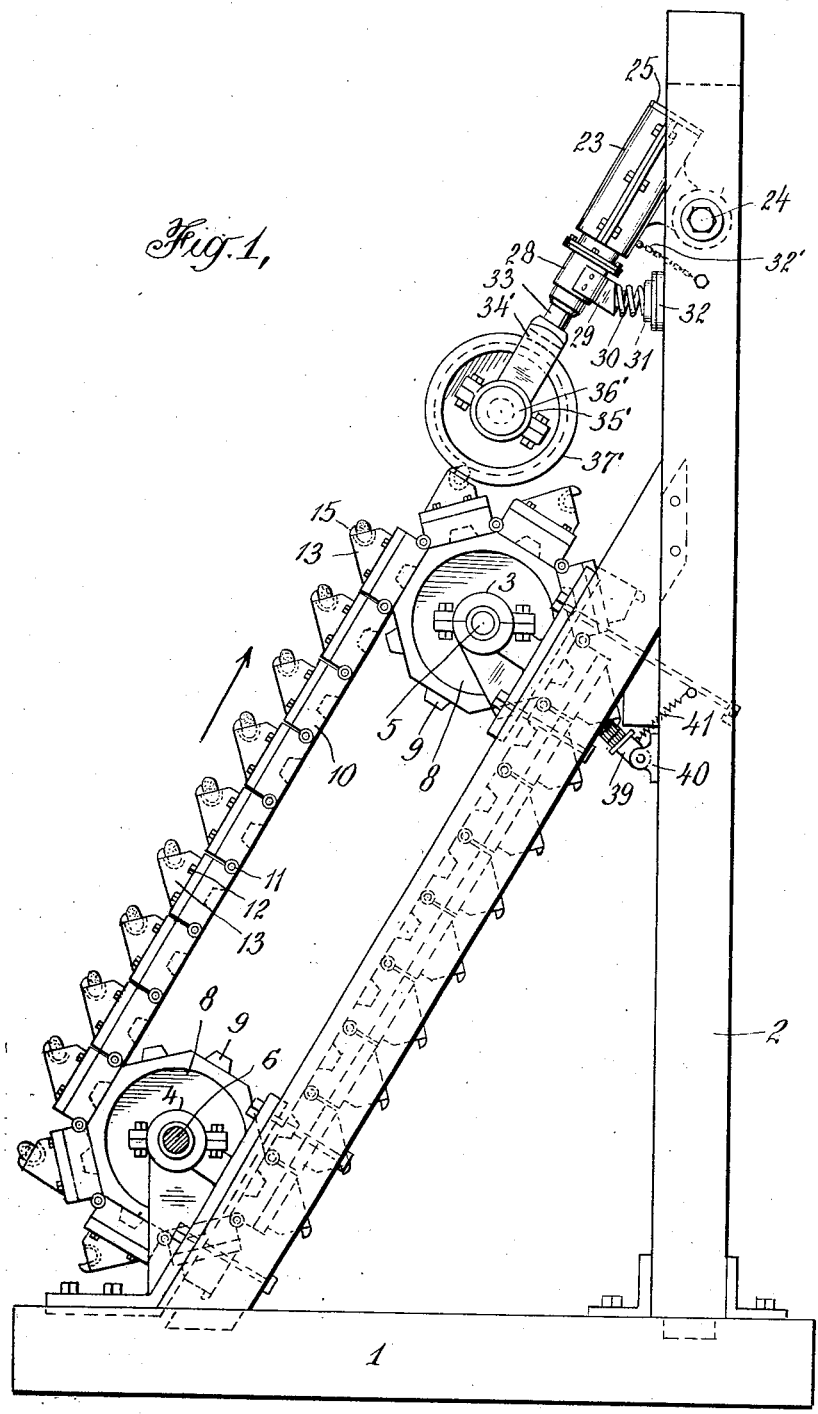
Inventor
F. A. G. Pape
By his Attorneys
Pennie, Davis, Marvin & Edmonds.

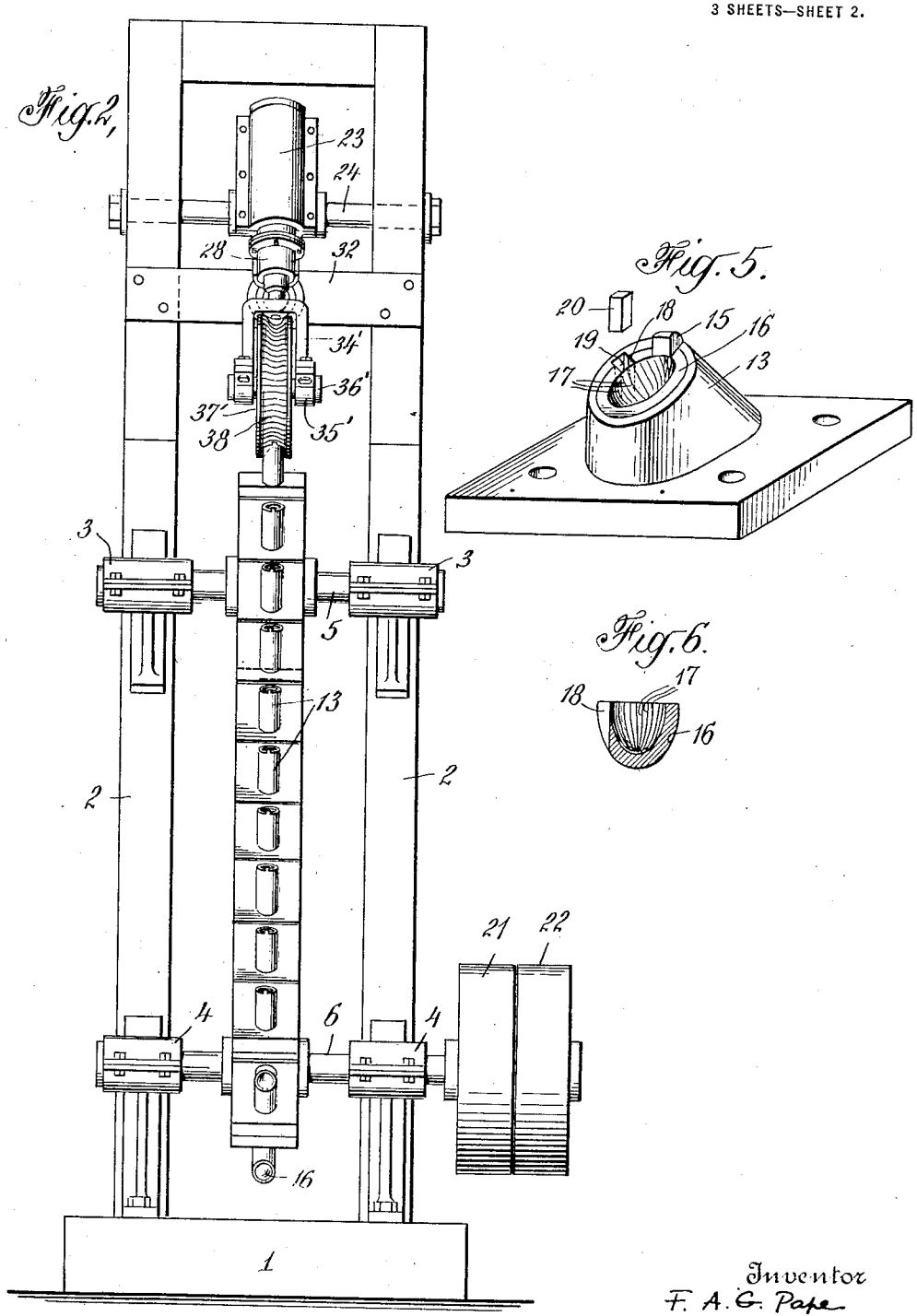

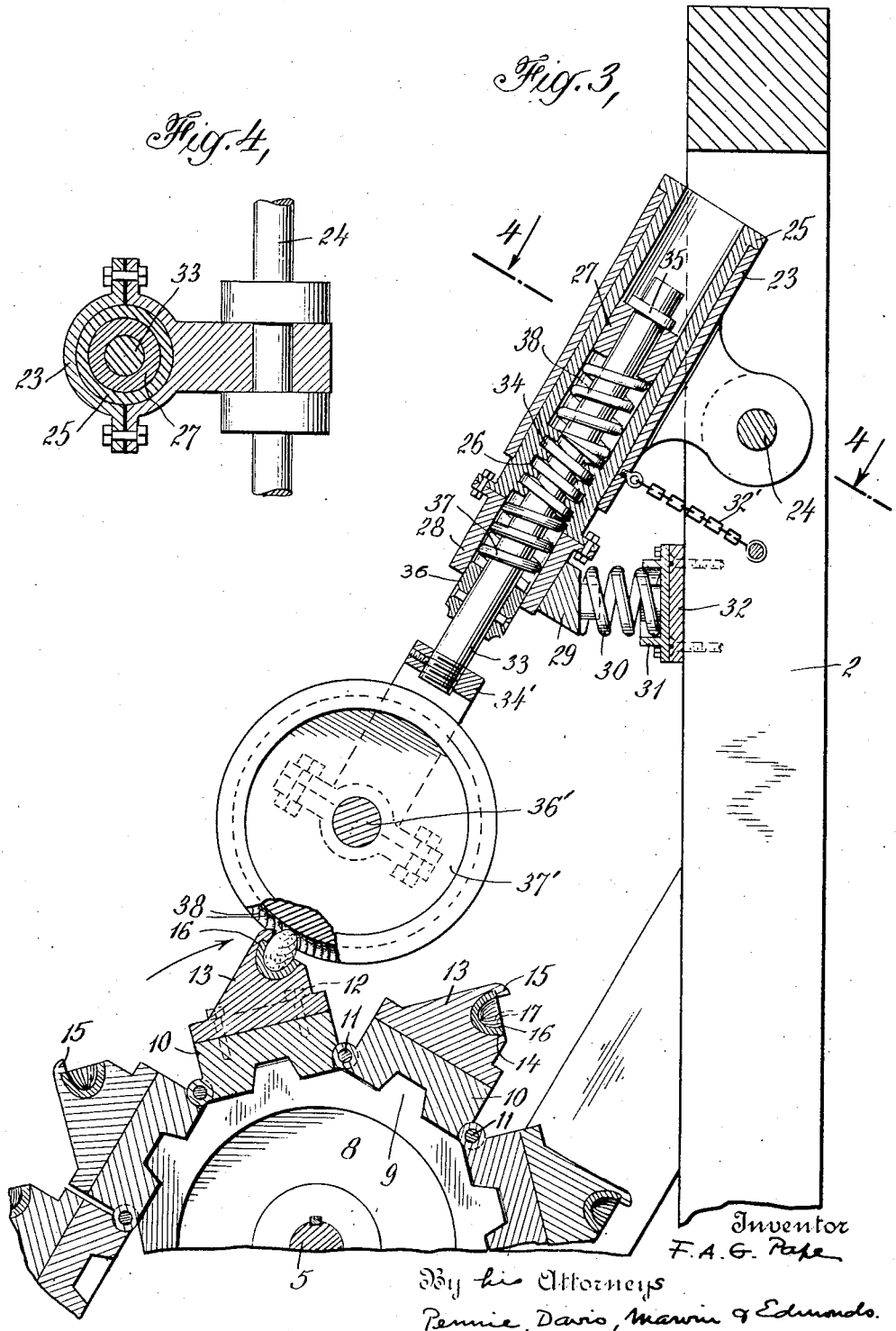

UNITED STATES PATENT OFFICE.

FREDERIC A. G. PAPE, OF NEW YORK, N. Y., ASSIGNOR TO LYMAN N. HINE, OF NEW YORK, N. Y.

NUT-CRACKING MACHINE.

1,342,690.   Specification of Letters Patent.   Patented June 8, 1920.

Application filed September 20, 1919. Serial No. 325,155.

*To all whom it may concern:*

Be it known that I, FREDERIC A. G. PAPE, a citizen of the German Republic, residing at New York city, in the county of New York, State of New York, have invented certain new and useful Improvements in Nut-Cracking Machines; and I do hereby declare the following to be a full, clear, and exact description of the invention, such as will enable others skilled in the art to which it appertains to make and use the same.

This invention is for a nut cracking machine, of a continuously operating type.

It is an object of the invention to provide a nut cracking device to which nuts are continuously fed and which rapidly and practically automatically cracks them.

It is a further object of the invention to provide a nut cracking device which subjects the nut simultaneously to a pressure and a twisting action whereby the hull is broken in a number of parts and the kernel left whole.

It is a further object of the invention to provide a nut cracking device provided with two nut gripping elements, so designed that when the nut is gripped between these elements and pressure exerted thereon, one of the elements is caused to twist, whereby it exerts a shearing twist on the shell of the nut and so breaks it.

Other objects and advantages will appear as the description proceeds.

In the drawings illustrating one embodiment of my invention,

Figure 1 is a side view;

Fig. 2 is a view looking from the left of Fig. 1;

Fig. 3 is a sectional view showing on an enlarged scale the nut cracking mechanism;

Fig. 4 is a section on the line 4—4 of Fig. 3;

Fig. 5 is a perspective view of the anvil; and

Fig. 6 is a sectional view of the nut socket.

Referring now to the drawings, a base portion 1 and vertical standards 2 support upper and lower bearings 3 and 4 respectively, in which turn shafts 5 and 6 respectively. Each of these shafts is provided with a sprocket wheel 8, the teeth 9 of which engage in sprocket blocks 10 that are linked together by pins 11 to form an endless belt.

Supported by bolts 12 on each sprocket block 10 is an anvil 13 provided with a circular recess 14 and a lug 15. In each circular recess 14 is seated a nut carrying socket 16 provided with corrugations 17 on the inside thereof adapted to grip the nut. Each socket 16 is provided with a slot 18 of substantially the width of the lug 15. In the edge of the circular recess 14, there is also a slot 19 of about the same width. The socket is put in place by engaging the lug 15 in the slot 18 and after pushing the socket down into the recess, it is then turned until slots 18 and 19 are in registry and locked in position by the pin 20. It may be removed obviously by a reversal of the above process in case it is desired to renew the socket in the event of its breakage or the wearing away of the corrugations.

Shaft 6 may be provided with the ordinary tight and loose pulleys at 21 and 22.

The means for exerting the pressure and shearing twist on the nut in the socket 16 will now be described. A sleeve 23 is pivoted on the shaft 24 supported by the standards 2. Fixed in the sleeve 23 is a cylinder 25 internally threaded as at 26, and provided on its interior with a fixed collar 27. A second cylinder 28 is bolted to the cylinder 25 as shown and is provided with a seat 29 for a spring 30, the other end of the spring being supported in the socket 31 carried by the cross piece 32. Spring 30 tends to press the just described parts outwardly, its action being limited by the chain 32'.

A shaft 33 provided with threads 34, which threads engage with the threaded portion 26 described above, is mounted in the cylinder 25 and has its upper end passing through the collar 27, its downward movement being limited by the washer 35.

A collar 36 is fixed to the shaft 33 and serves to confine a spring 37 between it and a portion of the cylinder 25, as shown. A second spring 38 is confined just above the threaded portion 26 and the collar 27. The purpose of these two springs is to return the shaft 33 to its normal position.

Fixedly carried by shaft 33 is a bracket 34' which carries bearings 35' in which turns a shaft 36' on which is mounted a wheel 37'.

Wheel 37' is grooved in its periphery as shown in Fig. 2 and the inside of the groove is provided with transverse corrugations 38 to grip the nut. The wheel 37' is preferably made rotatable.

The operation of the device will now be described. The belt is driven in direction of the arrow shown in Figs. 1 and 3, and the nut sockets are filled with nuts in any desired manner. The wheel 37 is so positioned that as each nut approaches it, the nut is forced against it so that a certain amount of pressure is exerted against the nut, whereupon a reactive pressure is exerted upon the shaft 33. This pressure exerted on the shaft 33, by virtue of the threaded mounting of the same causes the shaft to twist. Inasmuch as the nut is gripped by the corrugations 17 and 38, it is firmly held against rotating and a powerful shearing twist thereby exerted on the hull of the nut, which, in conjunction with the already described pressure exerted on the hull effectually breaks it. During this operation the wheel 37' moves along with the nut a short distance thereby compressing the spring 30 somewhat. The wheel 37', however, soon becomes disengaged from the nut and is forced outwardly to the position shown in Fig. 3 as limited by the chain 32' to be in position to engage with the next nut, whereupon the operation just described is repeated.

It should be understood that the pitch of the screw threads on the shaft 33 may be varied to suit the amount of twisting action it is desired to exert on the nut. Furthermore, wheel 37' may be mounted closer to or farther away from the anvils to exert a greater or less pressure on the nut as desired.

The springs 37 and 38 operate to return the shaft 33 to its original position after each nut is cracked.

Inasmuch as the nut sockets are liable to get clogged up with the hulls of the nuts, there is provided a brush 39 pivoted to a cross piece 40, in such a position that the bristles of the brush will engage with each nut socket as it goes by to brush out any hulls that may remain in the socket. A spring 41 is provided to bring the brush back to its initial position after each cleaning operation.

While I have shown the pressure exerting and twisting device in the form of a wheel, as at 37', it should be understood that this element does not need to be in the form of a wheel, but broadly comprises an element that will exert pressure and a shearing twist simultaneously, on the hull of a nut.

Inasmuch as nuts are of varying sizes, my machine will crack different sized nuts by simply changing the sockets 16 to a smaller or larger socket as the case may be. With the sockets 14 in the anvil remaining the same size, different sized nut carrying sockets may be obtained by making the walls of the socket 16 thicker or thinner, as desired.

It should be understood that the invention may be carried out in other ways as defined in the scope of the following claims.

I claim:

1. In a nut cracker, means to hold a nut against twisting, means to subject the nut to both pressure and a shearing twist, the pressure exerted by one of said means on the other causing the shearing twist.

2. In a nut cracker, means to exert both a pressure and a shearing twist on a nut, and nut carrying means to bring nuts one after another into operative contact with said first mentioned means.

3. In a nut cracker, means to exert both a pressure and a shearing twist on a nut, a series of anvils adapted each to carry a nut and means to move said anvils in succession into proximity to said first mentioned means, so that the nuts are successively forced into engagement with said first mentioned means.

4. The combination as claimed in claim 2, said first mentioned means being pivoted.

5. The combination as claimed in claim 2, said first mentioned means being resiliently mounted.

6. The combination as claimed in claim 2, in combination with means to clean out said nut carrying means after the cracking operation.

7. In a nut cracker, a wheel provided with a peripheral groove, nut-gripping corrugations in said groove, mounting means for said wheel adapted to cause said wheel to twist as pressure is exerted thereagainst, and means to successively force nuts into forcible contact with the sides of said groove.

8. In a nut cracker, an endless belt, a series of nut carrying anvils carried by said belt, a normally stationary, pivoted nut engaging device mounted in the path of travel of the nuts carried by said anvils so as to be brought into forcible successive engagement with the same and adapted to move about its pivot during the cracking operation, and means to drive said belt.

9. In a nut cracker, an endless belt, a series of nut gripping anvils carried thereby, a normally stationary nut engaging device mounted in the path of travel of the nuts carried by said anvils so that said nuts are successively brought into forcible contact with said device and cracked thereby, the nut carrying anvils and the nut engaging device coöperating to subject each nut to pressure and a shearing twist.

10. In a nut cracker, an endless belt, a series of nut gripping anvils carried thereby, a nut engaging device mounted so as to be brought into forcible engagement with successive nuts, and mounting means for said nut engaging device to cause it to twist from the pressure exerted thereagainst by the nut being cracked.

11. In a nut cracker, an endless belt, nut carrying anvils mounted thereon, a wheel rotatably and pivotally mounted provided with nut engaging means along the periphery thereof, mounted so that said nut engaging means is disposed in the path of travel of the nuts, and means to drive said belt.

12. In a nut cracker, an endless belt, upper and lower sprockets for mounting said belt, a series of nut carrying anvils carried by said belt and a normally stationary nut engaging device mounted in the path of travel of the nuts carried by said anvils, so as to forcibly engage and crack each nut as it is traveling around the upper sprocket.

In testimony whereof I affix my signature.

FREDERIC A. G. PAPE.